United States Patent [19]
Jones

[11] Patent Number: 5,842,715
[45] Date of Patent: Dec. 1, 1998

[54] VEHICULAR ENTERTAINMENT SYSTEM

[76] Inventor: Christopher A. Jones, 98 Candlewood Dr., Mantua, N.J. 08051

[21] Appl. No.: 769,756

[22] Filed: Dec. 20, 1996

[51] Int. Cl.$^6$ ........................................................ B60P 1/43
[52] U.S. Cl. .................... 280/727; 297/217.3; 297/217.4
[58] Field of Search ............................ 280/727; 297/163, 297/217.3, 217.4

[56] References Cited

U.S. PATENT DOCUMENTS

| | | | |
|---|---|---|---|
| 4,756,528 | 7/1988 | Umashankar | 280/727 X |
| 5,179,447 | 1/1993 | Lain | 358/254 |
| 5,267,775 | 12/1993 | Nguyen | 297/217 |
| 5,316,369 | 5/1994 | Kanda | 297/194 |
| 5,507,556 | 4/1996 | Dixon | 297/217.3 |
| 5,624,156 | 4/1997 | Leal et al. | 297/217.4 |
| 5,775,771 | 7/1998 | La Cour et al. | 297/238 |

*Primary Examiner*—Christopher P. Ellis

[57] ABSTRACT

A vehicular entertainment system including a pivotable mounting assembly with a rectangular configuration having a rear face with a bottom face, a top face, and a pair of side faces integrally coupled thereto and extending outwardly therefrom thereby forming an interior space with a front opening. The mounting assembly includes a pair of top couples situated on the top face adjacent opposite side faces and a pair of side couples each situated at a central extent of a corresponding side face. Further provided is a strap assembly including a piece of material situated on the front face of a front seat. A pair of top straps are each coupled at a first end thereof to an associated top couple of the mounting assembly and further coupled at a second end thereof to a top edge of the piece of material adjacent opposite side edges thereof. Associated therewith is a pair of side straps each coupled at a first end thereof to an associated side couple of the mounting assembly and further coupled at a second end thereof to an associated side edge of the piece of material wherein the side straps wrap about opposite side faces of the front seat. As such, the mounting assembly may be selectively secured to a rear face of the front seat with the front opening thereof facing a rear seat portion. Lastly, an entertainment unit is included for providing entertainment to a person residing in the rear seat portion of the vehicle.

9 Claims, 4 Drawing Sheets

VEHICULAR ENTERTAINMENT SYSTEM

BACKGROUND OF THE INVENTION

1. Field of the Invention

The present invention relates to a vehicular entertainment system and more particularly pertains to allowing the unique retrofitting of an entertainment unit to the rear of a front seat of a vehicle for the purpose of entertaining children.

2. Description of the Prior Art

The use of vehicular entertainment systems is known in the prior art. More specifically, vehicular entertainment systems heretofore devised and utilized for the purpose of entertaining passengers of a vehicle are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,756,528 to Umashankar; U.S. Pat. No. 4,982,996 to Vottero-Fin et al.; U.S. Pat. No. 4,521,021 to Dixon; U.S. Pat. No. Des. 349,298 to Leung; U.S. Pat. No. 5,359,349 to Jambor et al.; and U.S. Pat. No. 4,866,515 to Tagawa et al.

In this respect, the vehicular entertainment system according to the present invention substantially departs from the conventional concepts and designs of the prior art, and in so doing provides an apparatus primarily developed for the purpose of allowing the unique retrofitting of an entertainment unit to the rear of a front seat of a vehicle for the purpose of entertaining children.

Therefore, it can be appreciated that there exists a continuing need for a new and improved vehicular entertainment system which can be used for allowing the unique retrofitting of an entertainment unit to the rear of a front seat of a vehicle for the purpose of entertaining children. In this regard, the present invention substantially fulfills this need.

SUMMARY OF THE INVENTION

In view of the foregoing disadvantages inherent in the known types of vehicular entertainment systems now present in the prior art, the present invention provides an improved vehicular entertainment system. As such, the general purpose of the present invention, which will be described subsequently in greater detail, is to provide a new and improved vehicular entertainment system which has all the advantages of the prior art and none of the disadvantages.

To attain this, the present invention essentially comprises a front seat portion and a rear seat portion. The front seat portion includes at least one front seat with an intermediate portion having a front face, a rear face, and a pair of side edges therebetween. The front seat further includes a head rest with a post means coupled thereto for allowing a height of the head rest to be adjusted. With reference to FIGS. 3–4, a mounting assembly is included with a rectangular configuration having a rear face with a bottom face, a top face, and a pair of side faces integrally coupled thereto and extending outwardly therefrom thereby forming an interior space with a front opening. The mounting assembly has a pair of vertically oriented slots formed in the side faces adjacent the top face and the front opening thereof. A pair of top closed loop are couples situated on the top face adjacent opposite side faces. Associated therewith is a pair of side closed loop couples each situated at a central extent of a corresponding side face. Further provided is a strap assembly best shown in FIGS. 1 & 8. The strap assembly includes a rectangular piece of cloth situated on the front face of the intermediate portion of the front seat. A pair of top straps are each coupled at a first end thereof to an associated top closed loop couple of the mounting assembly. A second end of each of the top straps is coupled to a top edge of the piece of cloth adjacent opposite side edges thereof. As such, the top straps are situated on opposite sides of the post means of the seat. Further included is a pair of side straps each coupled at a first end thereof to an associated side closed loop couple of the mounting assembly. Such side straps are also coupled at a second end thereof to an associated side edge of the piece of cloth, wherein the side straps wrap about opposite side faces of the intermediate portion of the front seat. To this end, the mounting assembly may be selectively secured to the rear face of the front seat with the front opening thereof facing the rear seat portion. For providing entertainment to a person residing in the rear seat portion of the vehicle, an entertainment unit is provided. The entertainment unit has a rectilinear configuration with a front face, a bottom face, a top face, and pair of side faces formed therebetween defining an interior space. The entertainment unit is pivotally coupled at a central extent of the side faces thereof to the side faces of the mounting assembly. Such coupling is effected slightly below the vertically oriented slots so that the entertainment unit resides substantially within the interior space of the mounting assembly. The entertainment unit further has a pair of angled grooves on opposite side face thereof. It should be noted that the grooves each extend from a point adjacent the rear face and top face of the entertainment unit to central extent of the corresponding side face. Finally, an entertainment unit positioning assembly is provided. Note FIG. 6. The entertainment unit positioning assembly includes a pair of pins each having an outboard extent with a size larger than a width of the slots of the mounting assembly and a gripping means. Also a component of each pin is an intermediate extent integrally coupled to the outboard extent and adapted to be slidably situated within an associated groove of the mounting assembly. Each intermediate extent has a concentric detent formed therein for accepting a washer. Such washer is adapted to preclude the removal of the pin from the associated groove. An inboard extent is integrally coupled to the intermediate extent for slidably engaging with an associated groove of the entertainment unit. By this structure, upon the pins being moved upwardly within the slots, the entertainment unit pivots forward. Upon the pins being moved downwardly within the slots, the entertainment unit is pivoted rearward such that the front face thereof is positioned vertically.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicular entertainment system which has all the advantages of the prior art vehicular entertainment systems and none of the disadvantages.

It is another object of the present invention to provide a new and improved vehicular entertainment system which may be easily and efficiently manufactured and marketed.

It is a further object of the present invention to provide a new and improved vehicular entertainment system which is of a durable and reliable construction.

An even further object of the present invention is to provide a new and improved vehicular entertainment system which is susceptible of a low cost of manufacture with regard to both materials and labor, and which accordingly is then susceptible of low prices of sale to the consuming public, thereby making such vehicular entertainment system economically available to the buying public.

Still yet another object of the present invention is to provide a new and improved vehicular entertainment system which provides in the apparatuses and methods of the prior art some of the advantages thereof, while simultaneously overcoming some of the disadvantages normally associated therewith.

Still another object of the present invention is to allow the unique retrofitting of an entertainment unit to the rear of a front seat of a vehicle for the purpose of entertaining children.

Lastly, it is an object of the present invention to provide a new and improved vehicular entertainment system including a mounting assembly with a rectangular configuration having a rear face with a bottom face, a top face, and a pair of side faces integrally coupled thereto and extending outwardly therefrom thereby forming an interior space with a front opening. The mounting assembly includes a pair of top couples situated on the top face adjacent opposite side faces and a pair of side couples each situated at a central extent of a corresponding side face. Further provided is a strap assembly including a piece of material situated on the front face of a front seat. A pair of top straps are each coupled at a first end thereof to an associated top couple of the mounting assembly and further coupled at a second end thereof to a top edge of the piece of material adjacent opposite side edges thereof. Associated therewith is a pair of side straps each coupled at a first end thereof to an associated side couple of the mounting assembly and further coupled at a second end thereof to an associated side edge of the piece of material wherein the side straps wrap about opposite side faces of the front seat. As such, the mounting assembly may be selectively secured to a rear face of the front seat with the front opening thereof facing a rear seat portion. Lastly, an entertainment unit is included for providing entertainment to a person residing in the rear seat portion of the vehicle. The entertainment unit is pivotally coupled between the side faces of the mounting assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
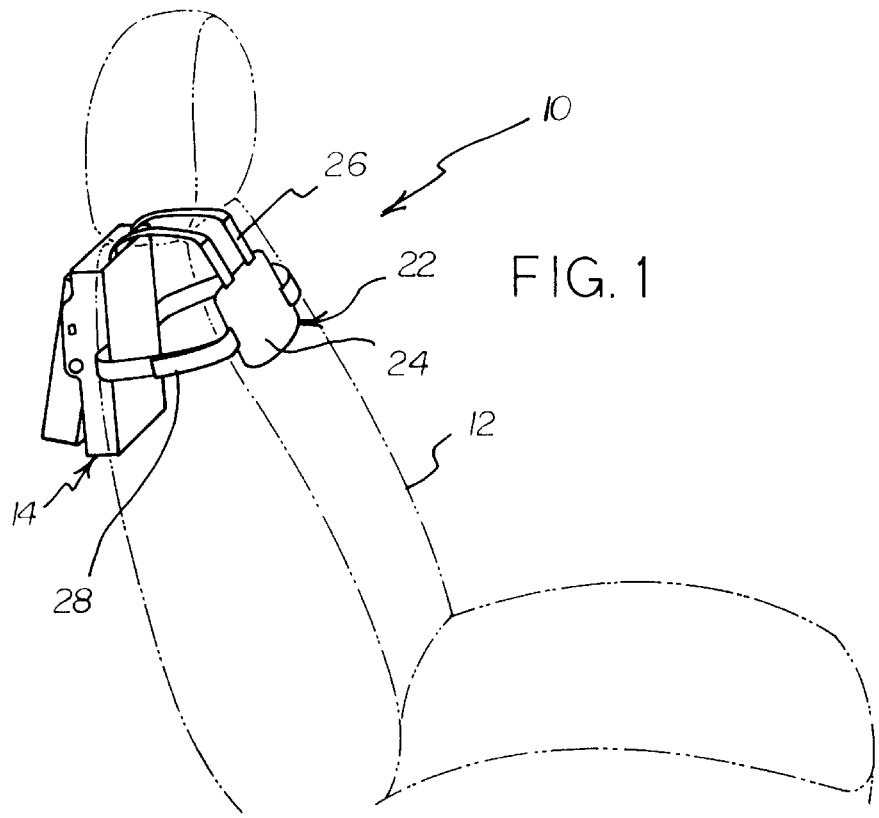
FIG. 1 is a perspective illustration of the preferred embodiment of the vehicular entertainment system constructed in accordance with the principles of the present invention.

With reference now to the drawings, and in particular to FIG. 1 thereof, a new and improved vehicular entertainment system embodying the principles and concepts of the present invention and generally designated by the reference numeral 10 will be described.

The present invention, the new and improved vehicular entertainment system, is comprised of a plurality of components. Such components in their broadest context include a mounting assembly, a plurality of straps, an entertainment unit, and an entertainment positioning assembly. Such components are individually configured and correlated with respect to each other so as to attain the desired objective.

More specifically, it will be noted that the system 10 of the present invention includes a vehicle with a front seat portion and a rear seat portion. The front seat portion includes at least one front seat 12 with an intermediate portion having a front face, a rear face, and a pair of side edges therebetween. The front seat further includes a head rest with a post means coupled thereto for allowing a height of the head rest to be adjusted.

Figure 3:
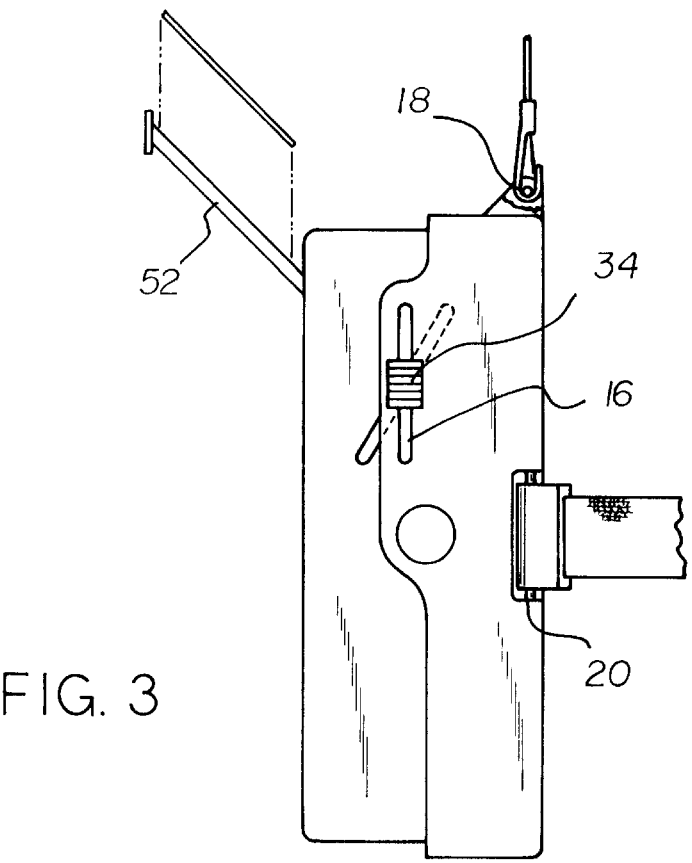
FIG. 3 is a side view of the mounting assembly and entertainment unit of the present invention.
Figure 4:
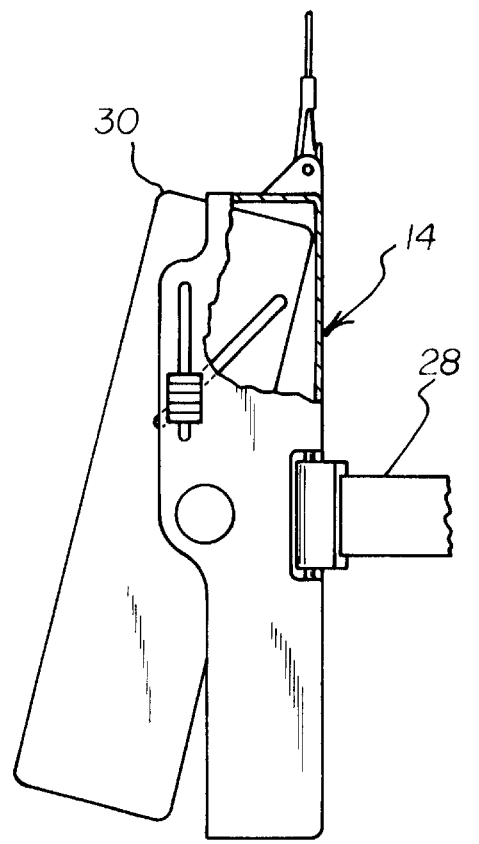
FIG. 4 is side view of the entertainment unit of the present invention in a first orientation.
Figure 5:
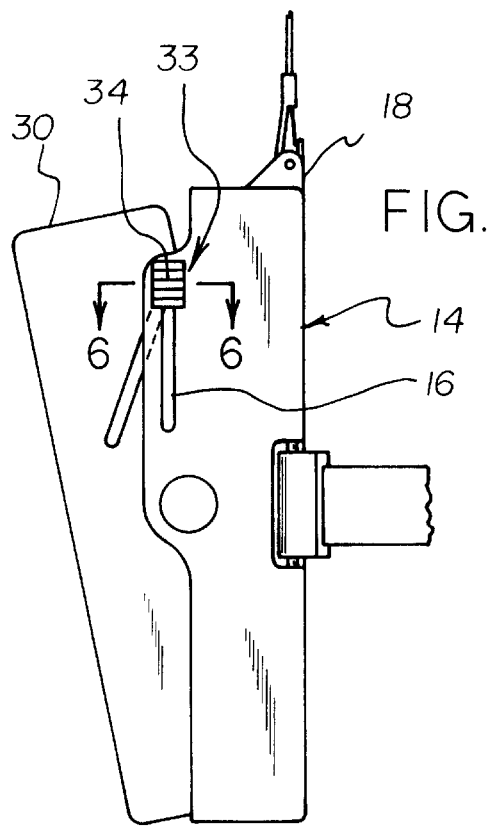
FIG. 5 is side view of the entertainment unit of the present invention in a second orientation.

With reference to FIGS. 3–4, a mounting assembly 14 is included with a rectangular configuration having a rear face with a bottom face, a top face, and a pair of side faces integrally coupled thereto and extending outwardly therefrom thereby forming an interior space with a front opening. The mounting assembly has a pair of vertically oriented slots 16 formed in the side faces adjacent the top face and the front opening thereof. A pair of top closed loop couples 18 are situated on the top face adjacent opposite side faces. Associated therewith is a pair of side closed loop couples 20 each situated at a central extent of a corresponding side face. Each closed loop couple preferably comprises a rod coupled at both ends thereof to the top and side faces of the mounting assembly.

Figure 8:
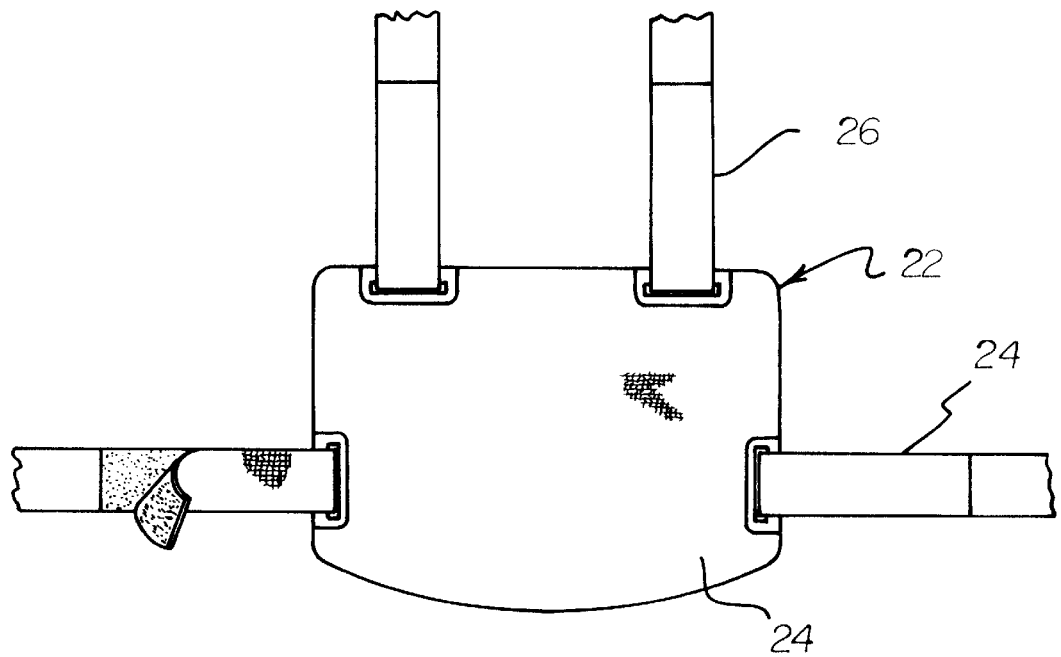
FIG. 8 is a front view of the strap assembly of the present invention.
Figure 9:
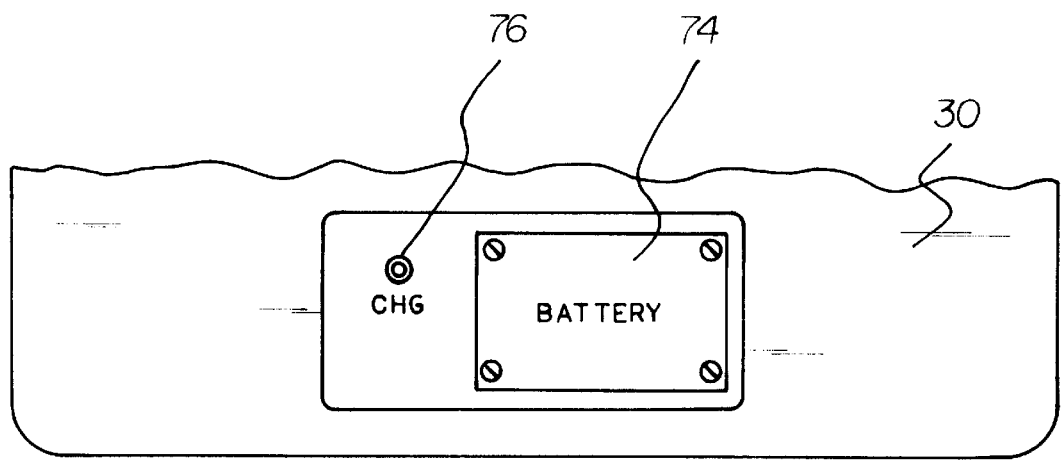
FIG. 9 is a rear view of the entertainment unit of the present invention.

Further provided is a strap assembly 22, as best shown in FIGS. 1 & 8. The strap assembly includes a rectangular piece of cloth 24 situated on the front face of the intermediate portion of the front seat. A pair of top straps 26 are each coupled at a first end thereof to an associated top closed loop couple of the mounting assembly. A second end of each of the top straps is coupled to a top edge of the piece of cloth adjacent opposite side edges thereof. As such, the top straps are situated on opposite sides of the post means of the seat. Further included is a pair of side straps 28 each coupled at a first end thereof to an associated side closed loop couple of the mounting assembly. Such side straps are also coupled at a second end thereof to an associated side edge of the piece of cloth, wherein the side straps wrap horizontally about opposite side faces of the intermediate portion of the front seat. As shown in FIG. 8, the second end of the top and side straps are equipped with pile fasteners for allowing the length of the straps to be varied to accommodate seats of various sizes and further allow decoupling of the straps from the piece of cloth. To this end, the mounting assembly may be selectively secured to the rear face of the front seat with the front opening thereof facing the rear seat portion.

For providing entertainment to a person residing in the rear seat portion of the vehicle, an entertainment unit 30 is provided. The entertainment unit has a rectilinear configuration with a front face, a bottom face, a top face, and pair of side faces formed therebetween defining an interior space. The entertainment unit is pivotally coupled at a central extent of the side faces thereof to the side faces of the mounting assembly. Such coupling is effected slightly below the vertically oriented slots in a position wherein the entertainment unit resides substantially within the interior space of the mounting assembly. Further, the pivotal coupling is situated slightly beyond the front opening of the mounting assembly to allow adequate movement, as will be described later in greater detail. The entertainment unit further has a pair of angled grooves 32 on opposite side face thereof. It should be noted that the grooves each extend from a point adjacent the rear face and top face of the entertainment unit to central extent of the corresponding side face.

Figure 6:
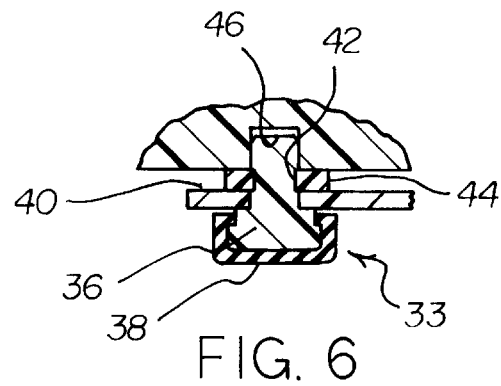
FIG. 6 is a cross-sectional view of the entertainment unit positioning assembly taken along line 6—6 shown in FIG. 5.

Finally, an entertainment unit positioning assembly 33 is provided. Note FIG. 6. The entertainment unit positioning assembly includes a pair of pins 34 each having an outboard extent 36 with a size larger than a width of the slots of the mounting assembly and a gripping means 38. Such gripping means ideally includes a corrugated elastomeric surface. Also a component of each pin is an intermediate extent 40 integrally coupled to the outboard extent and adapted to be slidably situated within an associated groove of the mounting assembly. Each intermediate extent has a concentric detent 42 formed therein for accepting a washer 44. Such washer is adapted to preclude the removal of the pin from the associated groove. Such washer also provides a frictional engagement with the mounting assembly. An inboard extent 46 is integrally coupled to the intermediate extent for slidably engaging with an associated groove of the entertainment unit. By this structure, upon the pins being moved upwardly within the slots, the entertainment unit pivots forward. Upon the pins being moved downwardly within the slots, the entertainment unit is pivoted rearward such that the front face thereof is positioned vertically.

Figure 2:
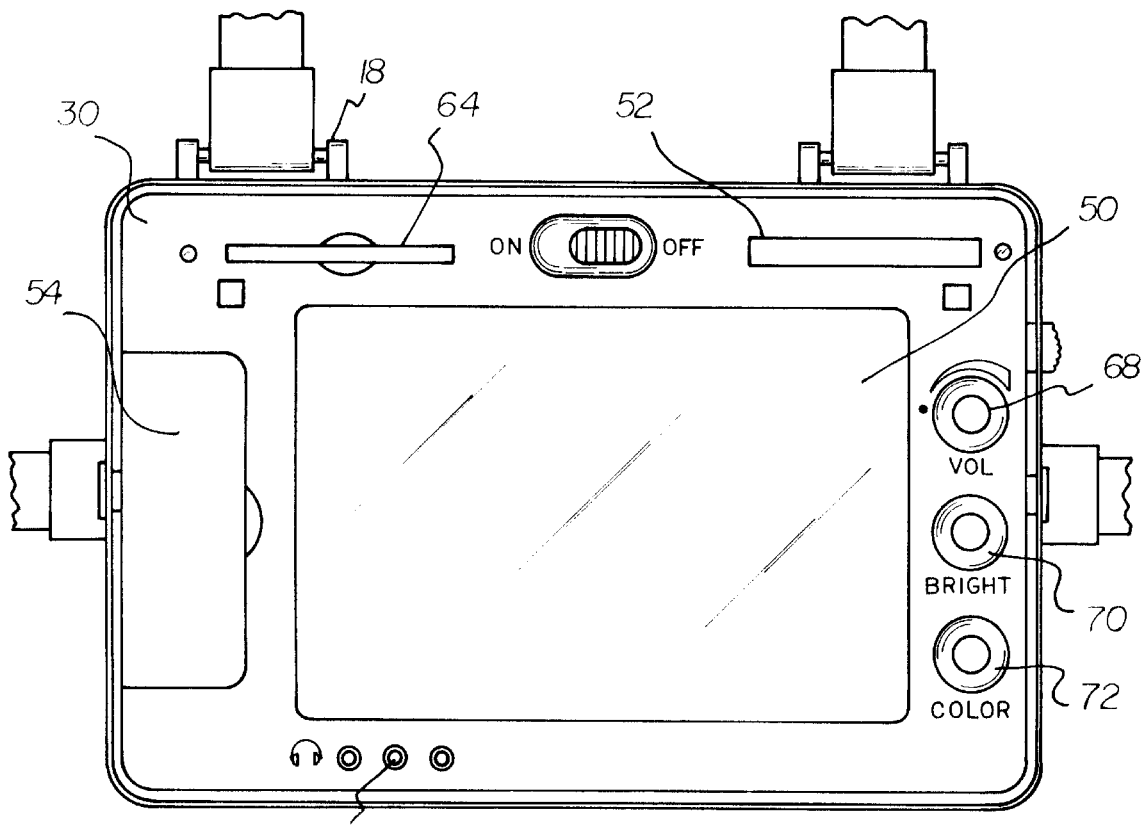
FIG. 2 is a front view of the entertainment unit of the present invention.
Figure 7:
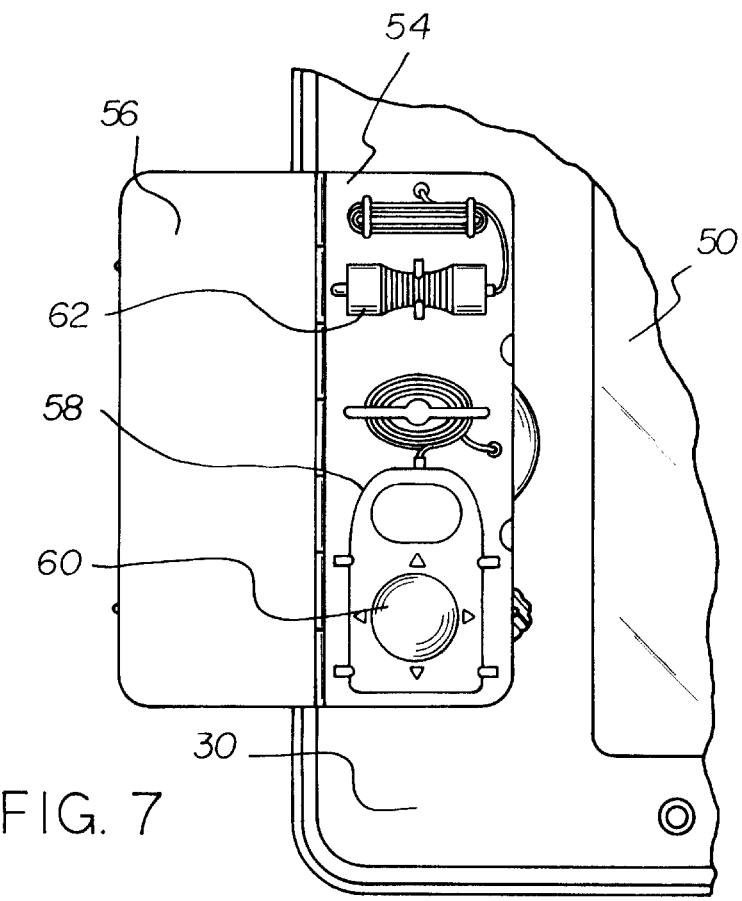
FIG. 7 is a close up view of the compartment and control mechanisms of the entertainment unit.

The entertainment unit is equipped with a display 50 situated on the front face thereof. Such display is ideally protected by a thick resilient plastic plate. A compact disc 52 receiving means is formed of a tray which is angularly situated within the interior space of the entertainment unit. As shown in FIG. 7, a compartment 54 is formed in the front face of the entertainment unit adjacent the display. The compartment includes an associated lid 56 for allowing selective access to the compartment. As shown in FIG. 7, a pair of detents are utilized to prevent the lid from being inadvertently opened. The entertainment unit also includes a plurality of peripheral control mechanisms 58 removably situated within the compartment for controlling the entertainment unit. Such peripheral control mechanisms preferably include a mouse 60 and a light pen 62. As shown in FIG. 2, the entertainment unit may be equipped with a variety of additional features for facilitating the use thereof. A conventional disk drive 64 may be included for accepting software therefrom. A head phone jack 66 may be included for allowing the use of conventional headphones. A plurality of controls may be included such as a volume dial 68, a bright dial 70, and a color dial 72. Lastly, a battery 74 and an associated charge interface 76 for allowing the recharging thereof may be included for powering purposes.

The present invention allows the use of an entertainment unit in a vehicle for the purpose of entertaining children situated in the rear seat of the vehicle. The entertainment unit is essentially a computer which does not require a keyboard for the use thereof. Such computer is equipped with the necessary features for executing software received via the compact disk receiving mechanism or disk drive, as is common in the art. Such software may be educational and/or entertaining in nature.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vehicular entertainment system comprising, in combination:

a vehicle with a front seat portion and a rear seat portion, each front seat portion including at least one front seat with an intermediate portion having a front face, a rear face, and a pair of side edges therebetween, the at least one front seat further including a head rest with a post means coupled thereto for allowing a height of the head rest to be adjusted;

a mounting assembly with a rectangular configuration having a rear face with a bottom face, a top face, and a pair of side faces integrally coupled thereto and extending outwardly therefrom thereby forming an interior space with a front opening, the mounting assembly having a pair of vertically oriented slots formed in the side faces adjacent the top face and the front opening thereof, a pair of top closed loop couples situated on the top face adjacent opposite side faces, and a pair of side closed loop couples each situated at a central extent of a corresponding side face;

a strap assembly including a rectangular piece of cloth situated on the front face of the intermediate portion of the front seat, a pair of top straps each coupled at a first end thereof to an associated top closed loop couple of the mounting assembly and further coupled at a second end thereof to a top edge of the piece of cloth adjacent opposite side edges thereof wherein the top straps are situated on opposite sides of the post means of the seat, a pair of side straps each coupled at a first end thereof to an associated side closed loop couple of the mounting assembly and further coupled at a second end thereof to an associated side edge of the piece of cloth wherein the side straps wrap about opposite side faces of the intermediate portion of the front seat, whereby the mounting assembly may be selectively secured to the rear face of the front seat with the front opening thereof facing the rear seat portion;

an entertainment unit for providing entertainment to a person residing in the rear seat portion of the vehicle, the entertainment unit having a rectilinear configuration with a front face, a bottom face, a top face, and a pair of side faces formed therebetween defining an interior space, the entertainment unit pivotally coupled at a central extent of the side faces thereof to the side faces of the mounting assembly slightly below the vertically oriented slots wherein the entertainment unit resides substantially within the interior space of the mounting assembly, the entertainment unit further having a pair of angled grooves on an opposite side face thereof, the grooves each extending from a point adjacent the rear face and top face of the entertainment unit to central extent of the corresponding side face; and an entertainment unit positioning assembly including a pair of pins each having an outboard extent with a size larger than a width of the slots of the mounting assembly and a gripping means; an intermediate extent integrally coupled to the outboard extent and adapted to be slidably situated within an associated groove of the mounting assembly, each intermediate extent having a concentric detent formed therein for accepting a washer which is adapted to preclude the removal of the pin from the associated groove; and an inboard extent integrally coupled to the intermediate extent for slidably engaging with an associated groove of the entertainment unit, whereby upon the pins being moved upwardly within the slots, the entertainment unit pivots forward and further upon the pins being moved downwardly within the slots, the entertainment unit is pivoted rearward such that the front face thereof is positioned vertically;

said entertainment unit further including a display situated on the front face thereof, a compact disc receiving means formed of a tray which is angularly selectively situated within the interior space of the entertainment unit, and a compartment formed in the front face of the entertainment unit adjacent the display, the compartment having an associated lid for allowing selective access to the compartment, the entertainment unit also including a plurality of peripheral control mechanisms removably situated within the compartment for controlling the entertainment unit.

2. A vehicular entertainment system for use with a front seat of a vehicle having an intermediate portion with a front face, a rear face, and a pair of side edges therebetween, the vehicular entertainment system comprising:

a mounting assembly with a rectangular configuration having a rear face with a bottom face, a top face, and a pair of side faces integrally coupled thereto and extending outwardly therefrom thereby forming an interior space with a front opening, the mounting assembly having a pair of top couples situated on the top face adjacent opposite side faces and a pair of side couples each situated at a central extent of a corresponding side face;

a strap assembly including a piece of material situated on the front face of the intermediate portion of the front seat, a pair of top straps each coupled at a first end thereof to an associated top couple of the mounting assembly and further coupled at a second end thereof to a top edge of the piece of material adjacent opposite side edges thereof, a pair of side straps each coupled at a first end thereof to an associated side couple of the mounting assembly and further coupled at a second end thereof to an associated side edge of the piece of material wherein the side straps wrap about opposite side faces of the intermediate portion of the front seat, whereby the mounting assembly may be selectively secured to the rear face of the front seat with the front opening thereof facing the rear seat portion; and an entertainment unit for providing entertainment to a person residing in the rear seat portion of the vehicle, the entertainment unit having a rectilinear configuration with a front face, a bottom face, a top face, and pair of side faces formed therebetween defining an interior space, the entertainment unit pivotally coupled at a central extent of the side faces thereof to the side faces of the mounting assembly.

3. A vehicular entertainment system as set forth in claim 2 wherein the mounting assembly further includes a pair of vertically oriented slots formed in the side faces adjacent the top face and the front opening thereof, the entertainment unit further having a pair of angled grooves on opposite side face thereof, wherein further included is an entertainment unit positioning assembly having a pair of pins each with an outboard extent including gripping means; an intermediate extent integrally coupled to the outboard extent and adapted to be slidably situated within an associated groove of the mounting assembly, each intermediate extent having a concentric detent formed therein for accepting a washer which is adapted to preclude the removal of the pin from the associated groove; and an inboard extent integrally coupled to the intermediate extent for slidably engaging with an associated groove of the entertainment unit, whereby upon the pins being moved upwardly within the slots, the entertainment unit pivots forward and further upon the pins being moved downwardly within the slots, the entertainment unit is pivoted rearward such that the front face thereof is positioned vertically.

4. A vehicular entertainment system as set forth in claim 2 wherein the entertainment unit further includes a display situated on the front face thereof.

5. A vehicular entertainment system as set forth in claim 2 wherein the entertainment unit further includes a compact disc receiving means formed of a tray which is angularly selectively situated within the interior space of the entertainment unit.

6. A vehicular entertainment system as set forth in claim 2 wherein the entertainment unit further includes a compartment formed in the front face of the entertainment unit adjacent the display, the compartment having an associated lid for allowing selective access to the compartment.

7. A vehicular entertainment system as set forth in claim 6 wherein the entertainment unit further includes a plurality of peripheral control mechanisms removably situated within the compartment for controlling the entertainment unit.

8. A vehicular entertainment system as set forth in claim 2 wherein the material is cloth.

9. A vehicular entertainment system for use with a front seat of a vehicle having an intermediate portion having a front face, a rear face, and a pair of side edges therebetween, the vehicular entertainment system comprising:

a mounting assembly selectively secured to the rear face of the front seat with the front opening thereof facing the rear seat portion, the mounting assembly having a pair of vertically oriented slots formed in side faces thereof;

an entertainment unit for providing entertainment to a person residing in the rear seat portion of the vehicle, the entertainment unit having a rectilinear configuration with a front face, a bottom face, a top face, and pair of side faces formed therebetween defining an interior space, the entertainment unit pivotally coupled at a central extent of the side faces thereof to the side faces of the mounting assembly, the entertainment unit further having a pair of angled grooves on an opposite side face thereof; and a pair of pins each slidably situated within an associated groove of the mounting assembly for slidably engaging with an associated groove of the entertainment unit, whereby upon the pins being moved upwardly within the slots, the entertainment unit pivots forward and further upon the pins being moved downwardly within the slots, the entertainment unit is pivoted rearward such that the front face thereof is positioned vertically.

* * * * *